United States Patent
Nguyen Phuoc

(10) Patent No.: US 7,800,323 B2
(45) Date of Patent: Sep. 21, 2010

(54) METHOD AND DEVICE FOR ESTIMATING THE SPEED OF AN ELECTRIC MOTOR

(75) Inventor: Vinh Tung Nguyen Phuoc, Boulogne Billancourt (FR)

(73) Assignee: Schneider Toshiba Inverter Europe SAS, Pacy-sur-Eure (FR)

(*) Notice: Subject to any disclaimer, the term of this patent is extended or adjusted under 35 U.S.C. 154(b) by 600 days.

(21) Appl. No.: 11/774,114

(22) Filed: Jul. 6, 2007

(65) Prior Publication Data
US 2008/0030187 A1    Feb. 7, 2008

(30) Foreign Application Priority Data
Jul. 7, 2006    (FR) .................... 06 06224

(51) Int. Cl.
*H02P 3/00* (2006.01)
(52) U.S. Cl. ............ 318/268; 318/609; 318/656; 318/400.14
(58) Field of Classification Search .......... 318/268, 318/609, 610, 656, 400.14; 324/160, 177
See application file for complete search history.

(56) References Cited

U.S. PATENT DOCUMENTS

| | | | |
|---|---|---|---|
| 6,577,096 B2 * | 6/2003 | Cho | 318/727 |
| 6,598,008 B2 * | 7/2003 | Lee | 702/147 |
| 6,909,257 B2 * | 6/2005 | Inazumi | 318/727 |
| 7,126,304 B2 * | 10/2006 | Suzuki | 318/400.04 |
| 7,294,988 B2 * | 11/2007 | Ajima et al. | 318/712 |
| 2006/0097688 A1 | 5/2006 | Patel et al. | |

FOREIGN PATENT DOCUMENTS

| | | |
|---|---|---|
| EP | 1 221 765 A1 | 7/2002 |
| WO | WO 94/03965 | 2/1994 |

* cited by examiner

*Primary Examiner*—Bentsu Ro
*Assistant Examiner*—Thai Dinh
(74) *Attorney, Agent, or Firm*—Oblon, Spivak, McClelland, Maier & Neustadt, L.L.P.

(57) ABSTRACT

The invention relates to a device and a method for estimating the rotational speed ω of an electric motor when freewheeling, the method being carried out in a variable speed drive for controlling the motor by generating reference alternating voltages Va, Vb. The method comprises a step for measuring the measured flux and torque currents Id and Iq of the motor in an orthogonal two-phase marker d, q, a step for determining said reference voltages Va, Vb, by carrying out a current regulation on the basis of said measured currents, and on the basis of zero reference currents Idref and Iqref in said marker d, q, and a step for calculating the rotational speed ω by evaluating the angle of rotation of the voltage vector, the components of which are said voltages Va, Vb in a fixed orthogonal two-phase marker a, b.

10 Claims, 1 Drawing Sheet

Figure 1:
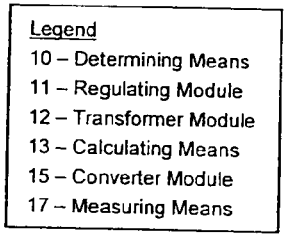

Legend
10 – Determining Means
11 – Regulating Module
12 – Transformer Module
13 – Calculating Means
15 – Converter Module
17 – Measuring Means

METHOD AND DEVICE FOR ESTIMATING THE SPEED OF AN ELECTRIC MOTOR

The present invention relates to a method for estimating the rotational speed of an electric motor, of asynchronous or synchronous type. This method is implemented within a variable speed drive and is intended to be used particularly for retaking control of the motor on the fly following a freewheeling period. The invention also relates to a device for estimating the rotational speed of a motor implementing such a method, as well as to a variable speed drive including such a device for estimating the speed.

To function at varying speed, an electric motor is normally driven by a frequency converter-type variable speed drive. Such a variable speed drive comprises a rectifier module which provides a continuous bus voltage from an external alternating network, and an inverter module comprising power semiconductor components such as to deliver to the motor a Pulse Width Modulation (PWM) variable voltage to the different phases of the motor, from the continuous bus voltage.

When a variable speed drive is to once again take over and control the motor after a more or less long freewheeling period during which the motor continues to turn as a result of its inertia, its real rotational speed must be known beforehand. This operation can occur for example after an unexpected power cut, a voluntary stop by the variable speed drive, or a fault with the variable speed drive. If the speed is wrongly estimated, there may then occur, while retaking control on the fly, considerable rushes of current resulting in the risk of putting a brake on the motor prior to restarting, as well as undesirable jolts in speed at the moment of retaking control. When the variable speed drive does not comprise a speed sensor, a method must therefore be implemented for estimating the rotational speed of the motor when freewheeling.

There are already different solutions for achieving this estimation of speed. One hardware solution consists in using a voltage measuring circuit which allows for the measurement of two mesh voltages (for example U-W and V-W). As a result of the residual electromotive force due to the rotation of the motor, these voltages are sine waves which are phase-shifted by +/−60°, the frequency of which corresponds to the electric speed of the motor. An adequate processing circuit then allows the extraction therefrom of the speed and the rotational direction of the motor. The disadvantage of this solution is the use of a circuit which must be very dynamic for measuring voltage, from the maximum voltage output from the variable speed drive through to the smallest possible voltage for the low speeds. This voltage circuit leads to an additional penalising cost. Furthermore, this circuit must be protected against disruptions caused by the long lengths and the shielding of the cables.

There is also a software solution which consists in applying a small voltage to the motor and carrying out a frequency scan from the positive maximum frequency through to the negative maximum frequency. When the scanned frequency is equal to the frequency of the residual electromotive force of the motor, the torque current $I_q$ notably moves to zero, which allows the speed of the motor to be obtained. This method does not require a voltage measuring circuit, but it nevertheless has the disadvantage of feeding non-zero current in the motor during this search phase, which risks putting a brake on it slightly. Furthermore, if the speed of the motor is slow and in the negative direction, the entire frequency scanning time, which can last several seconds, must pass before obtaining the speed estimation, and this makes the method too slow and therefore difficult to use.

In addition, document JP2004040837, applied to a Permanent Magnet Synchronous Motor (PMSM), describes a solution which uses a simplified equation Wm=Vqref/Ke, wherein Wm is the sought speed of the motor, Vqref is the torque voltage component in a marker d,q turning at the synchronous speed of the motor and Ke is a motor parameter representing the emf (electromotive force) constant of the motor. This solution has the disadvantage of having to know this emf constant which is specific to each type of motor. It would now be desirable to not have to know such a motor parameter, particularly to simplify the implementation of the variable speed drive by the user. Furthermore, this simplified equation is only valid if the marker d,q turns exactly at the right synchronous speed of the motor.

The invention therefore aims to propose a software method for estimating the speed of the motor, which is simple, quick to implement, does not require a speed sensor, and which does not have the aforementioned disadvantages. This method will be used in particular during the operation for retaking control of the motor on the fly.

To this end, the invention describes a method for estimating the rotational speed ω of an electric motor when freewheeling, the method being carried out in a variable speed drive for controlling the motor by generating reference alternating voltages Va, Vb. The method comprises a step for measuring the measured flux and torque currents Id and Iq of the motor in an orthogonal two-phase marker d,q, a step for determining said reference alternating voltages Va, Vb, by carrying out a current regulation on the basis of said measured currents, and on the basis of zero reference currents Idref and Iqref in said marker d,q, and a calculation step wherein the rotational speed ω is calculated by evaluating the angle of rotation of the voltage vector, the components of which are said reference alternating voltages Va, Vb in a fixed orthogonal two-phase marker a,b. The calculation step uses a PLL circuit which is input with the reference alternating voltages Va, Vb and which outputs the rotational speed ω.

Thus, the calculation step of the method only uses the relative phase-shift and frequency information of the alternating voltages Va, Vb to calculate the estimated rotational speed, without requiring knowledge of motor parameters.

The invention also describes a device for estimating the rotational speed ω in order to implement such a method. The device includes measuring means that deliver a measured flux current Id and a measured torque current Iq of the motor in an orthogonal two-phase marker d,q, determining means which output said reference alternating voltages Va, Vb, on the basis of the measured flux and torque currents Id and Iq, and on the basis of a zero reference current Idref and a zero reference current Iqref in said marker d,q, the determining means including a current regulating module, and calculating means which calculate the rotational speed ω by evaluating the rotational angle of the voltage vector, the components of which are said reference alternating voltages Va, Vb in a fixed orthogonal two-phase marker a,b. The calculating means include a PLL circuit module.

Advantageously, the described method and device apply to asynchronous motors as well as permanent magnet synchronous motors.

According to one feature, the measuring means provide the measured flux and torque currents Id and Iq in the marker d,q which turns at an estimated synchronous speed of the synchronous motor. The current regulating module outputs continuous signals Vdref, Vqref in relation to said turning marker d,q and the determining means include a transformer module which receives said continuous signals in order to provide said reference alternating voltages Va, Vb.

According to another feature suited to an asynchronous motor, the measuring means provide the measured flux and torque currents Id and Iq in the fixed marker d,q.

The invention also relates to a variable speed drive for controlling an electric motor and which includes such a device for estimating the rotational speed of the motor.

Figure 2:
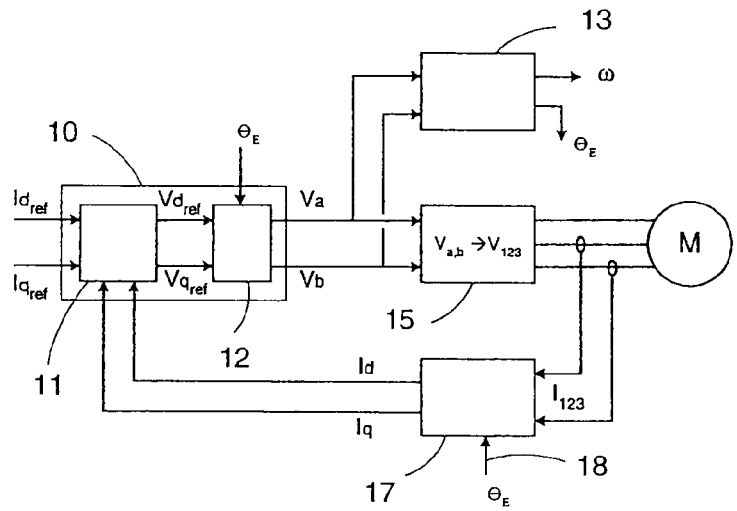
Figure 2:
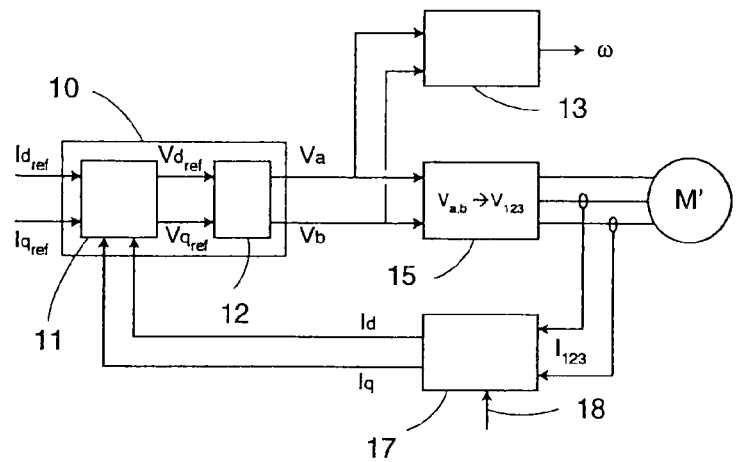
Figure 4:
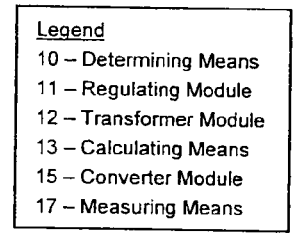
Figure 4:
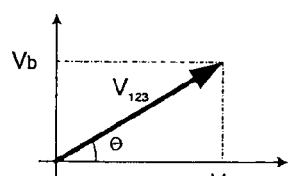
Figure 3:
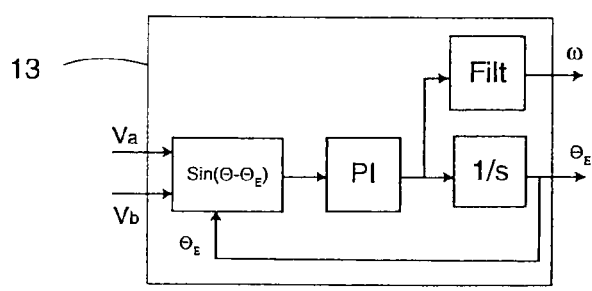

Other features and advantages will emerge from the following detailed description with reference to an embodiment given by way of example and illustrated by the appended drawings, wherein:

FIG. 1 is a simplified diagram of a first embodiment of the invention suited to a synchronous motor M, FIG. 2 is a simplified diagram of the first embodiment of the invention, suited to an asynchronous motor M', FIG. 3 details the calculating means of the device described in the invention, FIG. 4 is a diagram of the voltage vector $V_{123}$ in a fixed marker a,b.

Referring to FIGS. 1 and 2, a variable speed drive, of frequency converter type, includes a control unit (not shown in the figures) which is responsible for driving and monitoring the control of an electric motor M, M'. This control unit incorporates a device for estimating the rotational speed ω of the motor when it is freewheeling. In the presented example, this motor M, M' is a three-phase motor controlled in a known manner by a variable voltage $V_{123}$ applied with Pulse Width Modulation (PWM) to the three phases of the motor, by means of power semi-conductor components (not shown in the figures) of the variable speed drive which are driven by the control unit.

Within the context of FIG. 1, the motor M is preferably a permanent magnet synchronous motor, and within the context of FIG. 2, the motor M' is preferably an asynchronous motor.

It is possible, following, for example, a cut in the power of the variable speed drive, a voluntary stop by the variable speed drive control or some fault with the variable speed drive, that the control unit of the variable speed drive no longer controls the motor. The motor then continues to freewheel as a result of its inertia for a more or less long duration. If the variable speed drive is to once again take over and control the motor during this freewheeling period, before doing so, the control unit must then estimate the real rotational speed of the motor using a device for estimating the speed of the motor.

The speed estimation device described in the invention comprises means 17 for measuring a flux current Id and a torque current Iq of the motor. Conventionally, these currents Id and Iq are calculated in an orthogonal two-phase marker d,q on the basis of the measurement of the currents $I_{123}$ circulating in at least two of the three phases of the motor.

In the case of the synchronous motor M, the marker d,q turns at the synchronous speed of the motor M. The measuring means 17 must therefore also receive a signal 18 which represents the value of the estimated angle $\theta_E$ of rotation of the motor. The currents Id and Iq then are substantially continuous signals since the estimated speed converges very quickly (approximately a few msec) towards the real synchronous speed.

In the case of the asynchronous motor M', the marker d,q does not turn and is held fixed. The signal 18 is therefore forced to zero and the resulting currents Id and Iq are therefore alternating signals which are phase-shifted by +/−90°.

The speed estimation device then comprises determining means 10, the function of which is to provide reference alternating voltages Va and Vb which will be applied to the motor M, M'. These reference alternating voltages Va and Vb are calculated in a fixed orthogonal two-phase marker a,b. The determining means 10 include a current regulating module 11. The current regulating module 11 (or IDC (Injection of Direct Current) module) is inputted with the measured flux and torque currents Id and Iq coming from the measuring means 17. The current regulating module 11 is likewise inputted with a zero current reference according to the two components of the marker d,q, i.e. a zero reference current Idref and a zero reference current Iqref. At output, the current regulating module 11 generates reference signals Vdref and Vqref in the marker d,q.

To estimate the speed of the motor, the variable speed drive therefore carries out an injection and a regulation of zero current in the freewheeling phase so as to quickly and simply estimate the speed of the motor using software without interrupting the operation of the motor, prior to retaking control of the motor on the fly.

In the case of the synchronous motor M, the motor M has an emf (electromotive force) which is permanent and proportional to the speed. If the injection of zero current takes place at a fixed angle, then there will be braking of the motor when freewheeling. This is why the reference currents Idref and Iqref are zero in the marker d,q which turns at the synchronous speed of the motor. Since the marker d,q turns, the signals Vdref and Vqref are therefore continuous signals in this marker. The determining means 10 then comprise a transformer module 12 to transform the signals Vdref and Vqref in the turning marker d,q into reference alternating voltages Va and Vb in the fixed marker a,b. The transformer module 12 also receives the information of the value of the estimated angle $\theta_E$ of rotation of the motor in order to make this transformation.

In the case of the asynchronous motor M', since the marker d,q does not turn, the reference currents Idref and Iqref are zero in this fixed marker d,q and the signals Vdref and Vqref are therefore alternating signals. The transformer module 12 then receives a zero angle of rotation value and the alternating signals Vdref and Vqref coming from the regulating module 11 are therefore already the reference alternating voltages Va and Vb to be applied to the motor.

The reference alternating voltages Va and Vb output by the determining means 10 are therefore sine-wave signals, the mean of which is zero, which are phase-shifted by +/−90° in relation to one another. The relative phase shift between the voltages Va and Vb is the image of the direction of rotation of the motor and the frequency of the voltages Va and Vb is the image of the speed of the motor. They will then be converted in a conventional manner into a three-phase voltage $V_{123}$ in a three-phase marker by a converter module 15, this voltage $V_{123}$ then being applied to the different phases of the motor by the power semi-conductor components of the inverter module of the variable speed drive.

The speed estimation device then comprises means 13 for calculating the rotational speed ω of the motor. According to the invention, these calculating means 13 are installed in the control unit of the variable speed drive and are only inputted with the reference alternating voltages Va and Vb, without the need for other information such as parameters linked to the features of the motor. The calculating means make use of the fact that the reference voltages Va and Vb are alternating tensions in order to evaluate the angle θ of rotation of the voltage vector $V_{123}$, the components of which are said voltages Va, Vb.

According to a preferred embodiment which is detailed in FIG. 3, the calculating means 13 use a PLL (Phase Locked Loop) circuit. When small, the error between the estimated value $\theta_E$ of the angle of rotation of the motor and the value $\theta$ of the angle of the voltage vector $V_{123}$ can be described as follows:

$$\sin(\theta-\theta_E)=(Va*\cos\theta_E-Vb*\sin\theta_E)/V_{MOD}$$

wherein $V_{MOD}$ represents the module of $V_{123}$ ($V_{MOD}=SQR(Va^2+Vb^2)$), $V_{123}$ being the vector of the three-phase voltage applied to the motor, the components of which in the fixed marker a,b are Va and Vb respectively, as indicated in FIG. 4. The function of the PLL circuit then is to reduce the error between the value $\theta_E$ and the value $\theta$. When this error tends to zero, then the obtained value $\theta_E$ corresponds to the estimated value of the angle of rotation of the motor.

To this end, the PLL circuit calculates ($\theta-\theta_E$), then amplifies it using a PI (Proportional Integral) controller. The output of this PI controller is then filtered to output the estimated rotational speed $\omega$, and is furthermore reintroduced into an integrator block (1/s) to output the estimated angle of rotation $\theta_E$. The angle of rotation $\theta_E$ is likewise resent to the measuring means 17 and to the transformer module 12 in the case of a device adapted for a synchronous motor M.

Thus, irrespective of the value of the motor speed, the invention allows for quick estimation of the rotational speed $\omega$ of the motor with a delay which is substantially constant and determined mainly by the filtering of the signal $\omega$ (of approximately a few tenths of a second).

According to another possible embodiment, the calculating means 13 can also directly determine the estimated value $\theta_E$ of the angle of rotation of the motor by using the following formula:

$$\theta_E = \text{arc}tg\left(\frac{Vb}{Va}\right)$$

The estimated rotational speed $\omega$ is then obtained by derivation of the calculated value of $\theta_E$. However, this embodiment is less robust since it could be more susceptible to signal noise, particularly for Vdref, Vqref, and Va, Vb.

The method for estimating the rotational speed $\omega$ of the motor when freewheeling described in the invention therefore comprises a step for measuring the flux current Id and the torque current Iq of the motor by the measuring means 17. The method then comprises a step for determining the reference alternating voltages Va and Vb by implementing, in the determining means 10, a zero current regulation on the basis of the measured flux and torque currents Id and Iq, and on the basis of the zero reference currents Idref and Iqref. Finally, the method comprises a calculation step, wherein the calculating means 13 determine the estimated rotational speed $\omega$ by evaluating the angle of rotation $\theta$ of the voltage vector $V_{123}$, the components of which are said reference alternating voltages Va, Vb in a fixed orthogonal two-phase marker a,b.

In the case of an asynchronous motor M', it is preferable to wait for the motor to be defluxed before starting this speed estimation method, so as to not disrupt the motor during the injection of zero current. This is why the method can comprise a step for awaiting defluxing of the motor, which is carried out prior to the measuring step. In the freewheeling phase, the flux in an asynchronous motor decreases exponentially according to the rotor constant of the motor (of approximately 100 msec for a 4 kW motor). In the presented embodiment, this waiting step is carried out simply by the passing of a simple delay time of predetermined value between the decision to carry out an estimation of the rotational speed of the motor and the actual start of the measuring step.

The value of the delay time can either be fixed and sufficient to ensure adequate defluxing of all types of asynchronous motors, or preferably take into account the initial flux level and the rotor constant of the motor in order to optimise the waiting time according to the motor power.

Other alternatives and detail improvements may of course be envisaged without departing from the scope of the invention, as may the use of equivalent means.

The invention claimed is:

1. Method for estimating the rotational speed $\omega$ of an electric motor when it is freewheeling, the method being carried out in a variable speed drive for controlling the motor by generating reference alternating voltages Va, Vb, characterised in that the method includes:
   a step for measuring a flux current Id and a torque current Iq of the motor in an orthogonal two-phase marker d,q,
   a step for determining said reference alternating voltages Va, Vb, by carrying out a current regulation on the basis of said measured flux and torque currents Id and Iq, and on the basis of a zero reference current Idref and a zero reference current Iqref in said marker d,q,
   a calculation step wherein the rotational speed $\omega$ is calculated by evaluating an angle of rotation of a voltage vector, the components of which are said reference alternating voltages Va, Vb in a fixed orthogonal two-phase marker a,b, the calculation step using a PLL circuit which is inputted with the reference alternating voltages Va, Vb and which outputs the rotational speed $\omega$.

2. Speed estimation method according to claim 1, characterised in that the method comprises a step for awaiting defluxing of the motor, which is carried out prior to the measuring step.

3. Speed estimation method according to claim 2, characterised in that the waiting step consists in a delay time of a predetermined value depending on an initial flux level and a rotor constant of the motor.

4. Speed estimation method according to claim 1, characterised in that the method is implemented during a process for retaking control of the motor on the fly.

5. Device for estimating the rotational speed $\omega$ of an electric motor when it is freewheeling, the device being integrated into a variable speed drive for controlling the motor by means of reference alternating voltages Va, Vb, characterised in that the device includes:
   means for measuring a measured flux current Id and a measured torque current Iq of the motor in an orthogonal two-phase marker d,q,
   determining means which output said reference alternating voltages Va, Vb, on the basis of said measured flux and torque currents Id and Iq, and on the basis of a zero reference current Idref and a zero reference current Iqref in said marker d,q, the determining means including a current regulating module,
   and calculating means which calculate the rotational speed $\omega$ by evaluating an angle of rotation of a voltage vector, the components of which are said reference alternating voltages Va, Vb in a fixed orthogonal two-phase marker a,b, the calculating means including a PLL circuit module being input with the reference alternating voltages Va, Vb and outputting the rotational speed $\omega$.

6. Speed estimation device according to claim 5, characterised in that the measuring means provide the measured flux and torque currents Id and Iq in the marker d,q which turns at a synchronous speed of the motor.

7. Speed estimation device according to claim 6, characterised in that the current regulating module outputs continuous signals Vdref, Vqref in relation to said turning marker d,q and the determining means include a transformer module transforming said continuous signals into said reference alternating voltages Va, Vb.

8. Speed estimation device according to claim 5, characterised in that the measuring means provide the measured flux and torque currents Id and Iq in the fixed marker d,q.

9. Speed estimation device according to claim 5, characterised in that the device is used during a process for retaking control of the motor on the fly.

10. Variable speed drive for controlling an electric motor, characterised in that it includes a device for estimating rotational speed of the motor according to one of claims 5 to 9.

* * * * *